United States Patent [19]
Vollkommer et al.

[11] 4,119,612
[45] Oct. 10, 1978

[54] POLYMERIC AND OLIGOMERIC FORMALS

[75] Inventors: Norbert Vollkommer, Troisdorf; Gerhard Schade, Witten-Bommern; Egon Norbert Petersen, Neunkirchen-Seelscheid; Gerhard Bier, Troisdorf; Herbert Klinkenberg, Troisdorf-Eschmar; Werner Schmidt, St. Augustin-Niederberg, all of Germany

[73] Assignee: Dynamit Nobel Aktiengesellschaft, Troisdorf Bez. Cologne, Germany

[21] Appl. No.: 681,672

[22] Filed: Apr. 29, 1976

[30] Foreign Application Priority Data

May 2, 1975 [DE] Fed. Rep. of Germany ....... 2519575
May 2, 1975 [DE] Fed. Rep. of Germany ....... 2519576
Nov. 13, 1975 [DE] Fed. Rep. of Germany ....... 2550909

[51] Int. Cl.$^2$ .............................................. C08G 4/00
[52] U.S. Cl. .............................. 528/232; 260/45.7 R; 260/45.75 R; 260/45.75 B; 260/611 A; 260/615 P; 526/12; 526/13; 526/24; 528/243; 528/230
[58] Field of Search ............. 260/67 R, 67 A, 67 FP, 260/611 A, 615 P, 45.75 R, 45.75 B, 73 R, 75 T, 45.7 R; 526/12, 13, 24, 48

[56] References Cited
U.S. PATENT DOCUMENTS 2,071,252  2/1937  Carothers ....................... 260/67 FP

OTHER PUBLICATIONS

Jackson, W., & Caldwell J., Advances in Chemistry, vol. 34; 1962, pp. 200-207.

*Primary Examiner*—Lucille M. Phynes
*Attorney, Agent, or Firm*—Burgess, Dinklage & Sprung

[57] ABSTRACT

A polymeric formal having the general formula

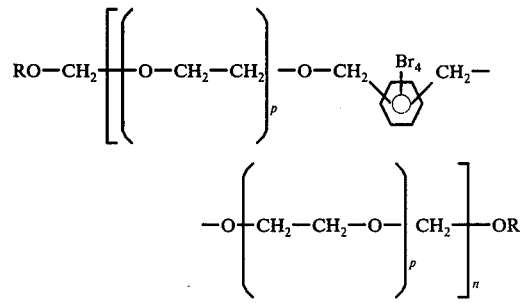

wherein $p$ is 0 or 1, $n$ is a positive integer from 2 to 200 and R represents optionally halogen-substituted straight-chained or branched-chained alkyl radicals having 3 to 8 carbon atoms, an aryl radical or an aralkyl radical which can be substituted on one or both sides with alkyl or hydroxyalkyl ether groups; improved methods for the preparation of such formals, tetrabromoxylylene-bis-($\beta$-hydroxyethylether) compounds employed in the preparation of such formals and the use of such polymeric and oligomeric formals as flame retardant agents in plastic compositions especially thermoplastic and polycondensation plastic compositions.

43 Claims, No Drawings

POLYMERIC AND OLIGOMERIC FORMALS

BACKGROUND OF THE INVENTION

Field of the Invention

This invention relates to novel oligomeric and polymeric formals of isomers of tetrabromoxylylene glycol and/or isomers of tetrabromoxylylene-bis-($\beta$-hydroxyethylether). This invention relates to new and improved methods for the preparation of such oligomeric and polymeric formals, to intermediates employed in the preparation thereof including pentabromobenzyl-$\beta$-hydroxyethylether and position isomers of tetrabromoxylylene-bis-($\beta$-hydroxyethylether). This invention further relates to methods for the preparation of such $\beta$-hydroxyethylethers and to the use of the oligomeric and polymeric formals as flame retardant agents for plastic compositions.

DISCUSSION OF THE PRIOR ART

It is known to render thermoplastic compositions fire resistant by adding thereto fire retardant substances during their production or fabrication. As a rule, the fire retardant substances which are employed for this purpose have no chemical relationship to the organic polymers, typically thermoplastics, which are being rendered fire resistant. Typically substances which have been employed as fire-retardant agents include metal oxides, as well as organic and inorganic substances of low molecular weight containing halogens, especially bromine and chlorine and/or phosphorus and/or nitrogen, or mixtures of compounds which enhance one another's fire-retardant properties.

Such additives have been added to thermoplastics, but have produced undesirable secondary effects owing to their impairment of the characteristics of the thermoplastics themselves. Hence, the addition of such non-chemically related fire-retardant agents to thermoplastics has limited their applications. For example, all of the fire retardant substances which are added to the thermoplastic in powder form and remain in powder form therein act not only as fire-retardants as they are intended but also as fillers which modify the mechanical properties of the plastics. These modifications have effected an embrittlement of the plastic and have impaired the elongation at rupture and impact strength of the plastic. Other additives, however, which melt when they are incorporated into the thermoplastics have given rise to further difficulties. These latter additives often have such a high vapor pressure at the fabrication temperatures involved that they produce large amounts of vapor in the extrusion and injection molding machines employed. Thus they interfere with the fabrication of the plastic composition into its final product. If they do not suffer from these disadvantages they often suffer from an inability to withstand thermal stresses in the fabricating machines and they tend to decompose and require the presence of still additional stabilizers. The presence of these additional stabilizers, in turn, further modifies the properties of the product in an uncontrollable manner and thus makes end product fabrication quite expensive.

All of the flameproofing agents of the prior art act as foreign substances after incorporation into the thermoplastics and have a greater or lesser tendency, depending upon the particular thermoplastic, to escape from the product by diffusion. Thus a coating often will gradually form on the plastic product, even at room temperature. This "chalking-out" phenomenon becomes even more unpleasant in the case of commercial articles which are used at temperatures higher than room temperature since then the chalking-out takes place to a greater and more rapid degree. This chalking-out of the flameproofing agent not only gradually removes the incombustibility of the plastics, but, moreover, the plastics which have this effect cannot be used at all in many applications such as, for example, in the construction of electrical appliances wherein the chalking out of the flame-proofing agent can lead to considerable trouble.

It has therefore become desirable to provide the fire-retardant substances which is chemically related to plastic compositions in which it is to be used. More especially, it has become desirable to provide a flame-retardant agent chemically related to such substances which has a melting point compatible with the processing temperatures employed in the fabrication of plastic molding and extrusion compositions into final articles. More especially, it has become desirable to provide a flame-retardant agent which represents an exceptionally high source of combined bromine and chlorine content. Moreover, it has become desirable to provide such a fire-retardant composition which is superior to known fire-retardant agents at a given combined bromine and chlorine content.

SUMMARY OF THE INVENTION

In accordance with this invention there is provided a new group of substances having a fire-retardant action which do not suffer from the disadvantages mentioned above and are outstandingly suitable as flameproofing agents for a wide variety of thermoplastics. The fire-retardant compositions of the present invention comprise oligomeric or polymeric formals having the formula:

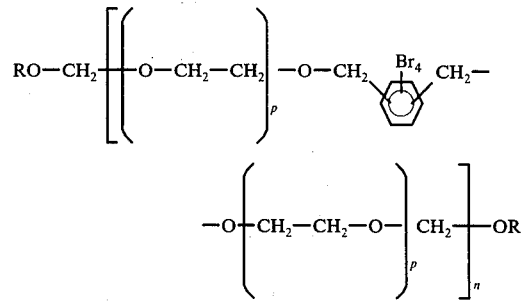

wherein $p$ is 0 or 1, $n$ is a positive integer from 2 to 200, R is an optionally halogen substituted straight or branched-chain alkyl radical having 3 to 8 carbon atoms, aryl radical or aralkyl radical, which can be substituted on one or both sides by an alkyl or hydroxyalkyl group. It has been found that the formals of the above formula have degrees of condensation in the oligomeric range and as such do not effect a chalking out when incorporated into a plastic composition containing a normally flammable polymer. Thus the oligomeric or polymeric formals of the present invention are particularly compatible to the polymers which are to be rendered fire-retardant.

The degree of condensation "n" has been found to have an influence on the melting range of the polymeric formals, as has also the nature of the terminal groups, so that in some cases it can be coordinated with the fabricating temperature of the various thermoplastics to be rendered fire-retardant. These fabrication temperatures generally range between 140° and 320° C. and most generally between 230° and 290° C. All of the formals of the present invention have melting points without decomposition within these temperature ranges. Compatibility of the polymeric formals with thermoplastics is so good that they can be added, for example, to a polyester while the polycondensation is still in progress without producing undesirable side effects, either optically or technically, even if the polyester undergoes a final treatment in a vacuum at high temperatures. Additionally, the thermal stability of the formals is so outstanding that they can be heated above the necessary fabricating temperature of the thermoplastics without any discoloration.

The polymeric or oligomeric formals of the present invention are preferably those wherein the radical is a member of the group of

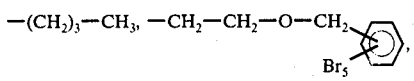

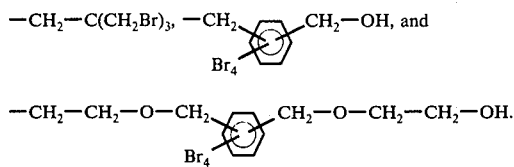

Additionally, R can be a halogen substituted aryl or aralkyl radical, particularly an aryl radical which is mononuclear. In the formula above it is preferred that the polyformals have a degree of condensation wherein $n$ has a value from 4 to 25.

DISCUSSION OF SPECIFIC EMBODIMENTS

The polymeric formals of the present invention are those represented by the above formula. They are prepared from tetrabromoxylylene glycols or tetrabromoxylylene-bis-($\beta$-hydroxyethylethers). While reference will be made herein to the preparation of polymeric formals derived from tetrabromo-p-xylylene glycol or bis-($\beta$-hydroxyethylether) it will be understood that the ortho and meta position isomers can be prepared by an analagous technique simply by selecting an ortho or meta monomer.

On the basis of tetrabromo-p-xylyleneglycol, formals are produced having the formula

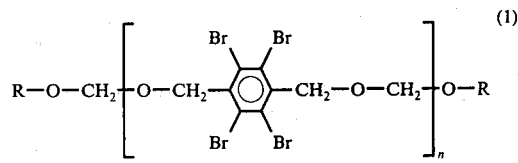

and on the basis of tetrabromo-p-xylylene-bis-($\beta$-hydroxyethylether), formals are produced having the formula:

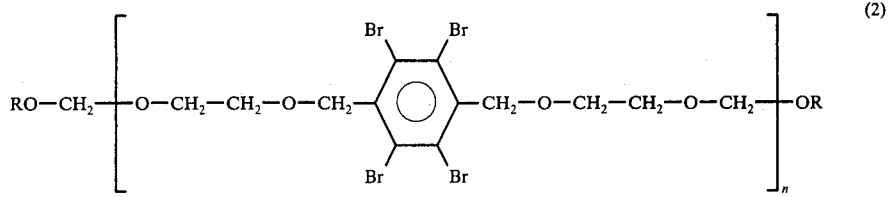

as well as polymeric formals on the basis of the o- and m- isomers used, having the chains in the o- and m-position on the benzene ring, respectively.

Within the generic formula expressed above there are contemplated mixed polymeric formals derived from mixing various contemplated monomers. For instance, tetrabromo-m-xylylene-glycol or the corresponding ($\beta$-hydroxyethylether) can admixed with either ortho or para monomers to prepare mixed polymeric formals. Especially contemplated are mixed formals containing moieties corresponding to tetrabromo-m-xylylene and moieties corresponding to tetrabromo-p-xylylene. Mixed polymeric formals of this particular type are derived from tetrabromo-m-xylylene glycols and/or tetrabromo-m-xylylene-bis-($\beta$-hydroxyethylether) and admixture with tetrabromo-p-xylylene glycol and/or tetrabromo-p-xylylene-bis-($\beta$hydroxyethylether) and have the following formula:

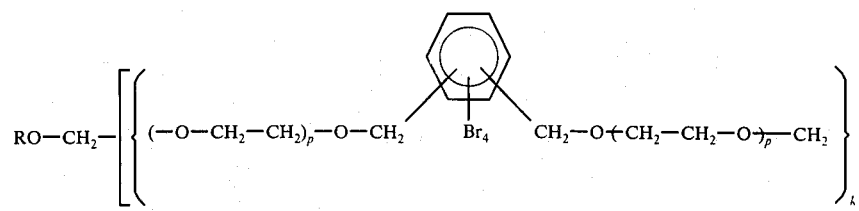

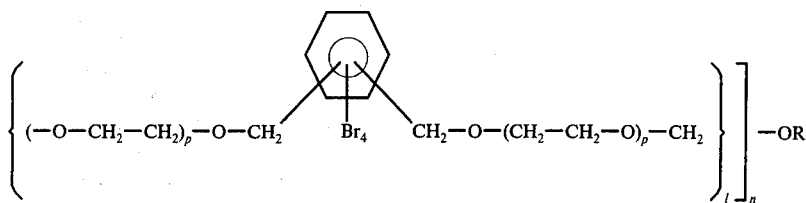

wherein $p$ is 0 or 1, $n$ is $k + 1$ is a whole positive number from 2 to 200, and the terminal group R represents halogen-substituted or unsubstituted, straight-chained or branched alkyl radicals of 3 to 8 carbon atoms or aryl or aralkyl radicals substituted on one or both sides with alkyl or hydroxyalkyl ether groups.

In accordance with one embodiment of the invention polymeric formals are prepared wherein $p = 1$. These polymeric formals are prepared from tetrabromoxylylene bis-($\beta$-hydroxyethylether) compounds. The paraisomer has the following formula

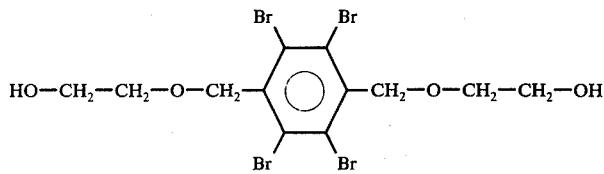

Where o- or m- isomers are obtained the monomer has the same formula except for the points at which the ether groups are joined to the aromatic nucleus. Also contemplated herein are pentabromobenzyl-$\beta$-hydroxyethylethers of the formula

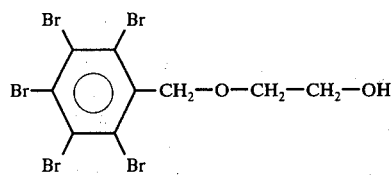

which can serve for the formation of the basic components of the polyformals or as a source for the terminal group R, as desired.

GENERAL MODES OF PREPARATION OF FORMALS

The preparation of polymeric formals from a number of specific diols is known, and is described for example in "Advances in Chemistry", vol. 34 (1962) p. 200 (W. Jackson and J. Caldwell). Accordingly, there are substantially two methods of preparation that are successful:

In the one method, which is transacetalization, the diol is reacted with dialkyl formals in the presence of acid catalysts such as $H_2SO_4$, $H_3PO_4$, benzenesulfonic acid, p-toluenesulfonic acid (p-TS) or methanedisulfonic acid, in accordance with the following equation:

$$m\ HO-R'-OH + m\ R-O-CH_2-OR \rightarrow$$
$$[-O-R'-O-CH_2-]_m + 2m\ ROH \quad (3)$$

the corresponding alkanol ROH being removed from the system as a volatile reaction component. Since the transacetalization reaction takes place in the 140°–180° C. temperature range, it is desirable to use dialkyl formals of low volatility in which the alkyl radicals contain three or more, preferably four, carbon atoms. Generally speaking the acid catalyst is present in the reaction mixture in an amount between 0.1 and 5% by weight, preferably between 0.3 and 1.5% by weight.

Although the dialkyl formal method has a wide range of application, it nevertheless has the disadvantage that the dialkyl formal must be prepared in a preceding step by reaction of the alkanol ROH with formaldehyde.

In the other method, described by Jackson and Caldwell, the diol is reacted with paraformaldehyde in accordance with Equation 4, in benzene or cyclohexane as solvent, in the presence of one of the above-named acid catalysts, and the water of the reaction is removed from the system.

$$m\ HO-R'-OH + m\ CH_2 = O \rightarrow$$
$$[-O-R-'-O-CH_2-]_m + mH_2O \quad (4)$$

Generally speaking the process is carried out at a temperature between 50° and 180° C., preferably between 70° and 160° C. The acid catalyst is generally present in an amount between 0.1 and 5% by weight, preferably between 0.3 and 1.5% by weight.

If the procedure described above is applied to the preparation of a polymeric formal of Structure 1 from tetrabromoxylyleneglycol, it is unsuccessful. The formaldehyde, which is formed by the depolymerization of the paraformaldehyde, escapes from the reaction system and the tetrabromoxylyleneglycol remains unaltered (Comparative Examples 5 and 6).

With this limitation just described, the preparation of the formals in accordance with Equations 3 and 4, using the diols tetrabromoxylylene glycol and tetrabromoxylylene-bis-($\beta$-hydroxyethylether), which have not previously been used for this purpose, is possible. However, it is not unconditionally preferred.

The polymeric formals of Formulas 1 and 2 can be successfully prepared by the transacetalization of tetrabromoxylylene glycol or tetrabromoxylylene-bis-($\beta$-hydroxyethylether), respectively, with dialkyl formal, especially dibutylformal, in the presence of acid catalysts, preferably, p-toluene sulfonic acid. Chlorinated aromatic hydrocarbons, such as chlorobenzene, o-dichlorobenzene or trichlorobenzene are used as the solvents, o-dichlorobenzene being preferred. The molar ratio of the tetrabromoxylylene glycol or tetrabromoxylylene-bis-($\beta$-hydroxyethylether) to dibutylformal can range from 2:1 to 1:2; preferably, the molar ratio of the diol to dialkyl formal will range from 1:1 to 1:1.5. The molar ratio of the reactants influences the nature of the terminal groups R in Formulas 1 and 2. If the molar ratio of the diol to the dialkyl formal is equal to or greater than 1, and if the univalent alcohol pentabromobenzyl-β-hydroxyethylether is not concomitantly used, the terminal groups will have essentially the structure:

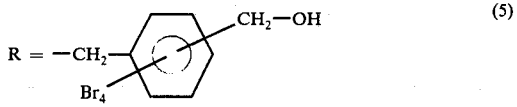  (5)

in the case of the use of tetrabromoxylyleneglycol as the diol, and, if tetrabromoxylylene-bis-(β-hydroxyethylether) is used as the diol, they will have the structure:

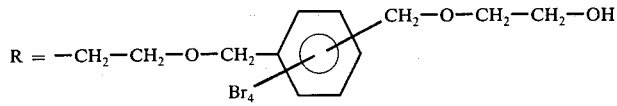

If the molar ratio of diol to dialkyl formal in the mixture is less than 1, terminal groups originating from the dialkyl formal will occur to an increasing extent; for example, in a polyformal on the basis of tetrabromoxylylene glycol or tetrabromoxylylene-bis-(β-hydroxyethylether) and dibutylformal, these will be terminal groups of the structure $$R = -CH_2-CH_2-CH_2-CH_3 \quad (7)$$

Whereas in the case of the predominant or exclusive presence of terminal groups of Structure 5 to 6 further polycondensation is impossible or possible to only a very limited extent, further enlargement of the molecule can take place, in the case of an equalized proportion of terminal groups of structures 5 and 7 or of structures 6 and 7, by further transacetalization with the splitting off of butanol, or, if terminal groups of structure 7 predominate, by transacetalization with the splitting off of dialkyl formal, especially dibutylformal, provided that conditions favorable thereto (reaction time and temperature rise in the presence of the acid catalyst) are selected.

Specifically, the preparation of the polyformals of Structures 1 or 2 through the dialkyl formals is performed by placing the reaction components, namely the diol (tetrabromoxylyleneglycol or tetrabromoxylylene-bis-(β-hydroxyethylether) and the dialkyl formal, especially dibutylformal, into o-dichlorbenzene, for example (40–70% solution), together with 0.1 to 5 wt.-%, preferably 0.3–1.5 wt.-% of p-toluenesulfonic acid, and heating the mixture to the reaction temperature, with stirring, and under a weak current of nitrogen. At a bath temperature of 150° to 160° C., the splitting off of the alkanol, especially of the butanol, begins, and this is removed from the reaction system through a distillation bridge. The temperature is increased in steps of 5° to 10° C., the required final condensation temperature depending on the desired degree of polycondensation (n). If higher molecular weights are desired in the polyformals, the molar ratio of the diol to the dialkylformal put in is to amount to 1 or less, and the final condensation temperature is to be 200° C. or more (bath temperature). It is preferable to use a slight excess of dialkyl formal, since some losses must be expected in the removal of the butanol by distillation. Under the conditions of the reaction, major proportions or the entire quantity of the o-dichlorobenzene serving as solvent is distilled off. If the latter is the case, the polyformal of Structure 1 will, towards the end of the reaction, be in the form of a granular, light-tinted product, and the polyformal of Structure 2 will be in the form of a melt.

The disadvantage of the above-described method of preparing the formals of Structures 1 and 2 lies in the fact that the dialkyl formal must be synthesized in a previous step, isolated, and purified by rectification.

IMPROVED MODES FOR THE PREPARATION OF POLYFORMALS

In accordance with an improved embodiment of the invention polymeric formals are prepared by contacting a dihydric alcohol with paraformaldehyde in the presence of a solvent and an acid catalyst, the process being carried out in the presence of at least additional alcohol.

In accordance with a preferred embodiment of the invention it has been found that the preparation of polymeric formals generally and the polymeric formals of the present invention specifically can be made in an economical manner in a single reaction step with substantially less complications than heretofore faced if the reaction of the dihydric alcohol with formaldehyde in the form of paraformaldehyde is conducted in the presence of an additional alcohol. The additional alcohol becomes a component of the reaction mixture and permits a very smooth and simple performance of the tetrabromoxylylene-bis-(β-hydroxyethylether) reaction with formaldehyde. The alcoholic component itself does not enter into the overall equation of the reaction and is consumed in only minor amounts. Most of the alcohol is recovered together with the solvent and the withdrawing agent used to remove the water from the circuit. It can be readily reused, without separating it into individual components in the batches that follow.

The alcoholic components can be straight-chained or branched alcohols of three to eight carbon atoms, such as for example saturated alcohols such as butanol, i-butanol tert.-butanol, pentanol, hexanol, 2-ethylhexanol, heptanol, and octanol, and likewise benzyl alcohol, cyclohexanol, and ether alcohols such as methyl glycol. Butanol is used preferentially.

The solvents for the reaction can be chlorinated aromatic hydrocarbons, such as chlorobenzene, dichlorobenzene or trichlorobenzene, as well as aprotic solvents such as dimethylformamide, dimethylacetamide, dimethylsulfoxide, N-methylpyrrolidone or diphenyl ether. o-Dichlorobenzene is used preferentially.

Aromatic hydrocarbons, such as benzene, toluene and xylene, can serve as withdrawing agents for the removal of the reaction water from the formation of acetal in accordance with Equation 4.

The molar ratio of the tetrabromoxylylene glycol or tetrabromoxylylene-bis-(β-hydroxyethylether) to the paraformaldehyde can range from 2:1 to 1:2. Preferably a molar ratio in the range from 1:1 to 1:1.5 is used. Generally the reaction is carried out at between 50° and 260° C., preferably between 80° and 240° C.

The same compounds as are used for the transacetalization of dibutyl formal can be used as catalysts; also, the amount of the catalyst acids by weight is the same. In one greatly preferred embodiment, the reaction components tetrabromoxylylene-glycol, paraformaldehyde and butanol, the p-toluenesulfonic acid catalyst, the o-dichlorobenzene solvent and the benzene serving for the withdrawal of the reaction water are heated at 90° to 100° C. (bath temperature) in a reaction vessel equipped with a water separator, while a stream of inert gas is passed over the mixture and the mixture is stirred. Within approximately 4 hours the reaction water has been removed in the form of an azeotropic mixture with benzene, and then the temperature is raised over a period of half an hour to 150° C. Over a period of 1½ hours, the temperature is increased in 10° C. steps to 220° C., thereby removing butanol and a great part of the o-dichlorobenzene from the reaction vessel. To complete the polycondensation, the bath temperature can be further heated to as much as 260° C., preferably to 240° C. After cooling, the product is washed with methanol, which can contain basic substances to neutralize the catalyst acid, such as ammonia or ammonium hydrogen carbonate, for the purpose of removing catalyst residues.

The polyformals are obtained in virtually quantitative yields with respect to the diols charged.

In addition to the diols, monoalcohols, preferably bromine-substituted, such as pentabromobenzyl-β-hydroxyethylether or tris-[bromomethyl]-ethanol, can be used for incorporation as terminal groups. The molar ratio of the univalent bromine-substituted alcohols to the diols can be between 1:100 and 1:1. A polyformal on the basis of tetrabromoxylyleneglycol with pentabromobenzyl-β-hydroxyethylether as terminal groups has the following structure:

more advantageously they can be added to the mixture at a time at which the construction of the polyformal chain molecule has been substantially or entirely completed. By this procedure the development of short-chain formals of Formula 8 with $n = 1$ is to a great extent avoided.

Likewise, through the use of tetrabromo-m- and -p-xylyleneglycol mixtures and/or tetrabromo-m- and -p-xylylene-bis-(β-hydroxyethylether) mixtures, one can synthesize polymers of mixed formals having meta-substituted and para-substituted tetrabromoxylylene radicals as basic building blocks in the same molecule, in accordance with the following formula:

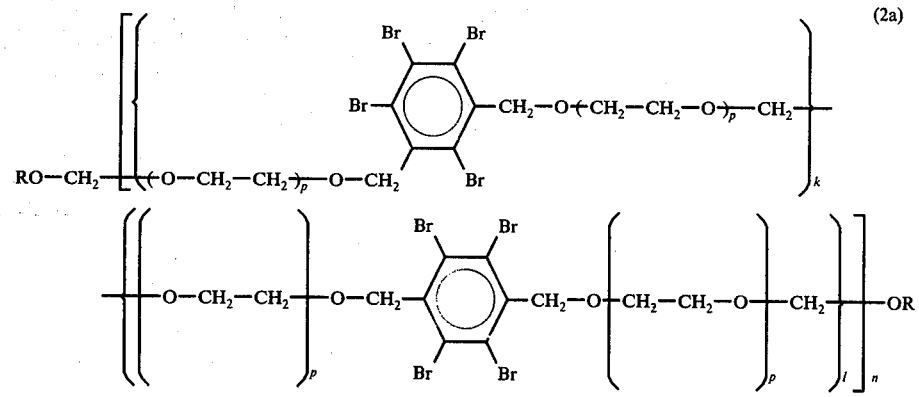

(2a)

wherein $p = 0$ or $1$, $n = k + 1$, is a whole positive number from 2 to 200, and the terminal group R has the same meaning as described above.

Generally $k$ is a value between 1 and 199 and 1 is a value between 199 and 1, the sum being equal to 2 200.

In general, the content of the p compounds will be able to be from 1 to 99 mole-% with respect to 100 mole-% of the mixture of the m and p compounds. The o compounds can also be contained in the mixture.

The new p, m and o isomers of tetrabromoxylylene-bis-(β-hydroxyethylether) and the pentabromobenzyl-β-hydroxyethylether can be obtained from p-, m- and o-tetrabromoxylylenedichloride, respectively, or mixtures of the isomers from mixtures thereof and pentabromobenzyl chloride, by reaction with ethylene glycol. In this case the tetrabromoxylylenedichloride, and pentabromobenzylchloride, as the case may be, is reacted with four to five times the amount, by weight, of ethylene glycol (EG). The reaction, which takes place in accordance with the rough equation 9, requires reaction temperatures ranging from 170° to 220° C.

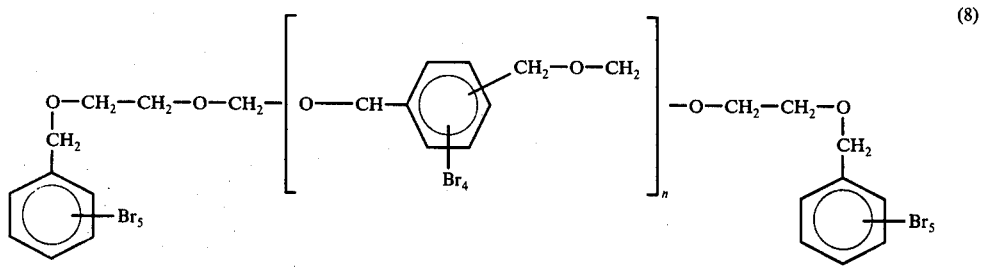

(8)

For the preparation of the formals of the above structure, the univalent bromine-substituted alcohols can be added to the reaction mixture together with the diols, or

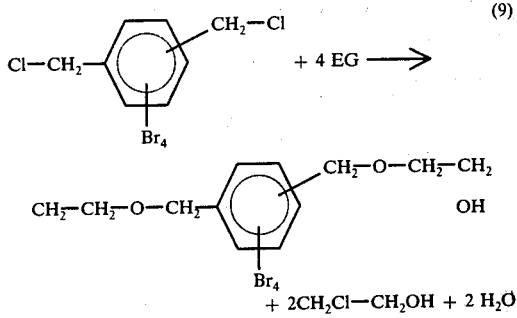

One disadvantage of this method is that a diol mixture having the following structure forms as the reaction product:

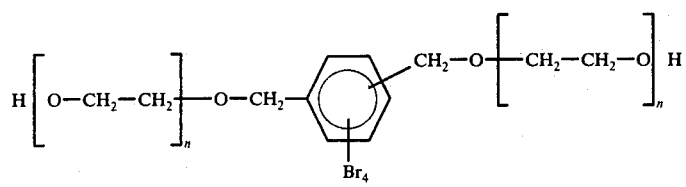

The average chain length of the hydroxyethylene side chain is then greater than one, and depends on the weight ratio of the reactants tetrabromoxylylenedichloride and EG. If the weight ratio of tetrabromoxylylenedichloride to EG is 1:2, $n$ will amount to approximately 2 to 3; if the weight ratio is 1:4, $n$ will be 1.6 to 1.8, and if it is 1:5, it will range from 1.3 to 1.5. Another disadvantage of this method of synthesis residues in the difficulty involved in separating the excess EG from the reaction product mixture of Formula 10, which is a ropy to waxy composition. The separation has to be performed either by thin-layer distillation in a high vacuum (molecular distillation) or by washing with water, the washing process and the drying process that follows being made difficult and tedious by the soft, plastic consistency of the products.

However, it has been found in accordance with a further embodiment of the invention that, in the presence of alkali metal hydroxide, such as KOH or NaOH, the reaction of EG with tetrabromoxylylenedichloride as well as with pentabromobenzylchloride yields uniform reaction products having the structural formulas 11 and 12, under substantially milder reaction conditions ranging between 80° and 160° C., preferably between 120° and 140° C.

Surprisingly, the transposition to tetrabromoxylylene-bis-(β-hydroxyethylether) (11) or to pentabromobenzyl-β-hydroxyethylether (12) takes place in the presence of amounts of alkali metal hydroxide which are substantially smaller than the amounts which would be necessary for salt formation and neutralization. For example, less than half of the amount of alkali hydroxide necessary stoichiometrically for the formation of the salt is sufficient for the synthesis of a tetrabromoxylylene-bis-(β-hydroxyethylether) of great purity, in virtually quantitative yields.

In a preferred embodiment, solid alkali metal hydroxide is dissolved in ethylene glycol at room temperature, and then the tetrabromoxylylenedichloride or pentabromobenzyl chloride, as the case may be, is added. The weight ratio of the EG to the tetrabromoxylylenedichloride or pentabromobenzylchloride ranges between 4:1 and 1:1, preferably between 3:1 and 1.5:1. The molar ratio of tetrabromoxylylenedichloride to alkalihydroxide ranges between 2:1 and 1:2, preferably between 1.5:1 and 1:1.5, and the molar ratio of pentabromobenzylchloride to alkali hydroxide ranges between 4:1 and 1:1, preferably between 3:1 and 1.3:1.

The reaction mixture is heated to the reaction temperature between 80° and 170° C., preferably 120° to 150° C., and the reaction is carried to completion within 1 to 10 hours, preferably 2 to 8 hours. Upon cooling, most of the reaction products 11 or 12 crystallize. The crystallization is completed by the continuous, slow addition of water. The crystals are suction filtered and washed chloride-free with water and dried. The products require no further refinement.

Tetrabromo-p-xylyleneglycol can be prepared, for example, as described in J. Am. Chem. Soc. 93 (1971) 14, pp. 3538-3540.

As indicated above the polymeric formals of the present invention have exceptional value as flameproofing agents for plastics. The oligomeric or polymeric formals of the invention can also be represented by the formula

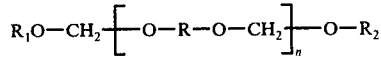

wherein R represents the groups:

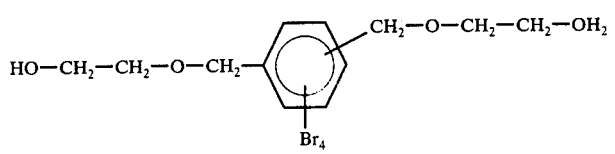

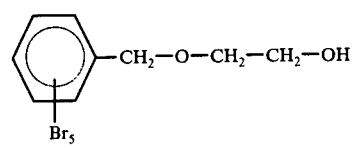

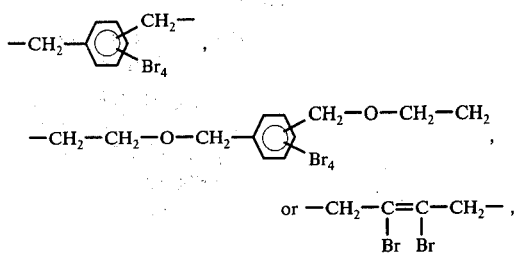

the terminal groups $R_1$ and $R_2$ represent identical or different, halogen-substituted or unsubstituted, straight-chained or branched alkyl radicals of 3 to 8 carbon atoms or aryl or aralkyl radicals substituted on one or both sides with alkyl or hydroxyalkyl ether groups, and the degree of polymerization $n$ represents whole positive numbers from 2 to 200.

The polymeric formals of the invention can be used especially to render fire resistant plastic composition containing thermoplastic and/or polycondensation polymers especially linear polyesters, polyolefins, polystyrene and ABS resins in addition to polyacetals, polyurethanes and other plastics. The fire retardant plastic compositions of the present invention generally include the normally inflammable plastic and between 5 and 30%, more generally between 5 and 20% of an oligomeric or polymeric formal of the present invention. Preferably, the fire retardant plastic composition contains between 7 and 12% of the oligomeric or polymeric formal of the invention.

In some instances, though not essentially, it is desirable to add an antimony or boron compound, especially an antimony or boron flame retardant composition in an amount of 2–12%, preferably 4 to 7% by weight to the fire retardant plastic composition. Through the addition of such antimony and/or boron compound there can imparted a synergistic flame retardency to the composition.

The flameproofing action is improved by the addition of metal compounds, especially oxides and carbonates or salts of other weak acids, especially those of the elements antimony, iron, zinc, boron and lead.

The halogen content of the polymeric formals ranges from 35 to 85%, preferably 50 to 75%, by weight, of bromine, plus, in some cases, a few percent—say up to 5 wt.-%—of chlorine.

The fire-retardant plastics are generally made from molding compositions to which the flameproofing agent is added and incorporated during the compounding, together with the additives commonly incorporated in this operation. In the production of fire-retardant thermoplastics containing fillers, the flameproofing agents of the invention can be worked into the thermoplastic molding compositions separately or simultaneously with the fillers. The molding compositions thus prepared are preferentially suited for the production of filled or reinforced fire-retardant injection moldings. However, on account of the good compatibility of the flameproofing agent, it is also possible to add it directly to the granulated plastic. Due to the excellent stability of the flameproofing agents, they can even be added during the polymerization or polycondensation, as the case may be, for example during the final stage of the polycondensation of polyesters.

The testing of the fire-retardant plastics by long exposure to heat as high as 200° C., in some cases at a vacuum of as much as 1 Torr, in the examples to be described herein, has shown that even under these drastic test conditions the oligomeric and polymeric formals surprisingly do not sweat or migrate out of the plastics.

The plastics of the invention are therefore used to special advantage wherever plastic products are desired which, when frequently exposed to high heat, will retain their unaltered fire resistance, as in the case, for example, of machine parts, outdoor facing materials on buildings, etc.

In the formulas that are given for polymeric formals, the nature and distribution of the terminal groups has been determined analytically, and therefore relates statistically to the specimen tested, not to the individual molecules thereof.

EXAMPLES

A number of polymeric formals and plastics are further explained in the examples, without restricting the invention to the information given therein, a comparison being made in some cases with known flameproofing agents of good effectiveness which have an even higher bromine content.

EXAMPLE 1

Preparation of tetrabromoxylylene-bis-($\beta$-hydroxyethylether)

In a reaction vessel provided with stirrer and gas introduction tube 100 g of ethylene glycol was placed, 4.0 g (0.1 mole) of solid sodium hydroxide was added, and under a slow stream of nitrogen the sodium hydroxide was dissolved over a period of 5 h at room temperature. Then 49.06 g (0.1 mole) of tetrabromo-p-xylylenedichloride was added and heated to the reaction temperature of 140° C. Over a period of 1 to 2 h, the tetrabromoxylylenedichloride dissolved with reaction. After a total of 8 h of reaction time at 140° C., the mixture was let cool, whereupon most of the tetrabromo-p-xylylene-bis-($\beta$-hydroxyethylether) crystallized out. 200 ml of water was added, with stirring, over a period of 1 h, and the crystalline reaction product was suction filtered and washed free of chlorine with water. The product was dried at room temperature until its weight was constant. The yield was 51.6 g, corresponding to 95 wt.-%. On the basis of the infrared and NMR spectrum, the compound had the following structure:

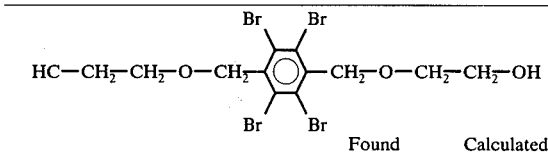

|  | Found | Calculated |
|---|---|---|
| OH number | 196 | 207 |
| Br | 53.9 | 59.0 |
| Cl* | 3.6 | — |
| Melting point | 94–98° C | — |

*The chlorine content resulted from a slight bromine-chlorine exchange in the aromatic nucleus in the preparation of tetrabromo-p-xylylenedichloride from tetrabromo-p-xylene.

EXAMPLE 2

Preparation of pentabromobenzyl-($\beta$-hydroxyethylether)

In a reaction vessel provided with stirrer and gas introduction tube, 2.0 g (0.05 mole) of solid sodium hydroxide was dissolved in 100 g of ethylene glycol at room temperature, with stirring, and under a slow stream of nitrogen. Then 50 g (0.096 mole) of pentabromobenzyl chloride was added and the temperature was increased to 140° C. for 8 hours. Upon cooling, most of the reaction product crystallized out. 150 ml of water was added, with stirring, over a period of 1 hour, and the pentabromobenzyl-β-hydroxyethyl ether was suction filtered, washed free of chlorine with water and dried.

The yield amounted to 50.9 g, corresponding to 96%.

On the basis of the infrared and NMR spectra, the compound had the following structure:

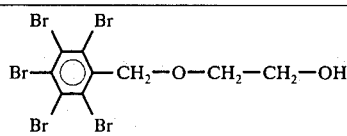

| | Found | Calculated |
|---|---|---|
| OH number | 98 | 102 |
| Br | 69.6 | 73.1 |
| Cl* | 3.1 | — |
| Melting point | 130–134° C | — |

*The chlorine content resulted from a slight bromine-chlorine exchange in the aromatic nucleus in the preparation of the pentabromobenzylchloride from pentabromotoluene.

EXAMPLE 3

Preparation of a polyformal of Formula 1 by the dialkylformal method

In a reaction vessel equipped with stirrer and a descending condenser system, 200 ml of o-dichlorobenzene was placed and 152.8 g (0.336 mole) of tetrabromo-p-xylyleneglycol, 59.2 g (0.369 mole) of dibutylformal and 1.06 g of p-toluenesulfonic acid (as transacetalization catalyst) were added. The molar ratio of tetrabromoxylyleneglycol to dibutylformal amounts to 1:1.1. The mixture was heated to the reaction temperature under a stream of nitrogen. At a bath temperature of 150°–160° C., the transacetalization began, as indicated by the splitting off of butanol. The temperatures was increased in 10° C. steps over a period of 2 hours to 240° C., a large part of the o-dichlorobenzene used as solvent being also distilled off towards the end of the reaction, and the reaction product occurred as a finely granular material suspended in a residue of o-dichlorobenzene.

The polyformal was washed with methanol containing 5% by volume of concentrated aqueous ammonia solution (for the neutralization of the p-toluenesulfonic acid), and was dried up to 150° C.

149 g of a polyformal was obtained having a melting range from 274° to 285° C. The yield, with respect to the tetrabromoxylyleneglycol, amounted to 95%.

In addition to the bands of the tetrabromoxylylene radical, the infrared spectrum showed a band multiplet in the region between 1000 and 1110 cm$^{-1}$, which is to be associated with the acetal function. A weak OH valence vibration at 3460 cm$^{-1}$ indicated the presence of OH terminal groups.

The bromine content is 68.2%.

On the thermal scale (air, heating rate 8° C./min), the polyformal showed the following weight losses: 1% at 273° C.; 5% at 310° C. and 10% at 318° C.

EXAMPLE 4

Preparation of a polyformal of Formula 1 in accordance with the preferred embodiment of the invention 227 g (0.5 mole) of tetrabromo-p-xylyleneglycol, 16.5 g (0.55 mole) of paraformaldehyde, 1.5 g p-toluenesulfonic acid, 175 g of butanol, 125 ml of o-dichlorobenzene as solvent, and 100 ml of benzene as a withdrawal agent for the reaction water, were combined in a reaction vessel provided with a condensing system and a water separator, and heated at 100° C. bath temperature under a slow stream of nitrogen. Within 3 h the reaction water in accordance with Equation 4 had been removed from the system. A descending condenser system was installed and the bath temperature was increased over a period of 0.5 h to 150° C. and held at 150° C. for one-half hour. The temperature was increased to 220° C. in 10° steps over a period of 2 hours and was held at that level for one hour. At this time the benzene, the butanol and a portion of the o-dichlorobenzene serving as solvent were distilled off. To increase the polymerization degree n in structure Formula 1, the mixture was heated further at 240° C., until no more o-dichlorobenzene passed over. After cooling, the granular polyformal was washed and dried as in Example 3.

225 g of a polyformal were obtained, which on the basis of infrared spectroscopy was in harmony with structural Formula 1. Two-thirds, approximately, of the terminal groups originated from the tetrabromoxylyleneglycol; the remainder consist of butylene terminal groups. The yield was 96.5%, the melting range was 280° to 295° C.

The bromine content, according to elemental analysis, amounted to 68.8%.

The TGA weight loss (heating rate 8° C./min; air) was 1% at 297° C.; 5% at 310° C. and 10% at 315° C.

EXAMPLE 4a

Same as Example 4, but with the use of 0.5 mole of paraformaldehyde, and at a condensation temperature up to 240° C., a formal developed having a bromine content of 69.2% and a melting range from 250° to 270° C., the terminal groups originating quite predominantly from tetrabromoxylyleneglycol.

EXAMPLE 4b

By the procedure of Example 4, but with the use of 0.58 mole of paraformaldehyde and at a condensation temperature up to 240° C., a polyformal was obtained having a bromine content of 69% and a melting range of 236°–260° C., and having terminal groups of which about half originate from the tetrabromoxylyleneglycol and the other half consist of butyl terminal groups.

EXAMPLE 5

Example for comparison with Example 4, without the addition of butanol 45.4 g (0.1 mole) of tetrabromo-p-xylyleneglycol, 3.3 g (0.11 mole) of paraformaldehyde, 0.4 g of p-toluenesulfonic acid, 30 ml of o-dichlorobenzene as solvent, and 40 ml of benzene as a withdrawal agent for the reaction water, were combined in a reaction vessel equipped with a condensing system and a water separator, and were heated under a slow stream of nitrogen at 100° C. bath temperature. Hardly any reaction water formed; instead, a white coating of polyformaldehyde formed on the inside walls of the condensing system.

Nevertheless, the experiment was conducted to the end, under the same conditions and temperatures as in Example 4.

41 g of a product having a melting point of 246°–249° C. was obtained, which on the basis of a comparison of infrared spectra proved to be identical with the starting product tetrabromo-p-xylyleneglycol (melting point 250°–253° C.).

EXAMPLE 6

Example for comparison with Example 4, without the addition of butanol

By following the procedure of Example 5, but with a greater excess of paraformaldehyde (molar ratio of tetrabromoxylyleneglycol to paraformaldehyde = 1:1.5), naught but the unaltered starting product tetrabromoxylyleneglycol was again obtained.

EXAMPLE 7

227 g (0.5 mole) of tetrabromo-p-xylylene glycol, 19.5 g (0.65 mole) of paraformaldehyde, 1.2 g of p-toluene-sulfonic acid, 170 g of butanol, 125 ml of o-dichlorobenzene and 100 ml of benzene as withdrawing agent for the water of reaction, were heated together at 100° C. (bath temperature) in a reaction vessel equipped as in Example 4, under a slow current of nitrogen. Over a period of 3 h the water of reaction was removed from the system. A descending condenser system was installed and the bath temperature was raised over a period of half an hour to 150° C. and maintained at that temperature for half an hour. The temperature was raised within 1 hour in 10° C. steps to 180° C. and maintained at that level for 2 hours.

Approximately one-fifth of the mixture was removed from the reaction vessel. Upon cooling, the polyformal precipitated; it was washed with methanol containing a small amount of $(NH_4)_2CO_3$ (to neutralize catalyst residues), and dried up to 150° C. (specimen 7a).

The rest of the mixture was heated at 200° C. and maintained at that temperature for 1 hour. Then a sample was again taken and treated as above (specimen 7b).

The mixture was heated for another hour at 220° C. (specimen 7c), for another hour at 240° C. (specimen 7d), and for another at 260° C. (specimen 7e), samples being taken each time and washed and dried the same as specimen 7a.

On the basis of infrared analysis, products 7a to 7e were polyformals of the following structure, having butyl formal terminal groups.

The following relationship (14) existed between the degree of polycondensation n and the bromine content [Br] of the polyformals as determined by elemental analysis:

$$n = \frac{160 \cdot [Br]}{31966 - 466 \cdot [Br]} \quad (14)$$

The following table shows the bromine content [Br] as well as the degree of polycondensation n as determined by Equation 14, for the specimens 7a to 7e taken in the individual phases of the polycondensation:

| Polyformal | Found Br | n (per Eq. 14) |
|---|---|---|
| 7a | 58.9 | 2 |
| 7b | 63.3 | 4 |
| 7c | 67.1 | 15 |
| 7d | 67.8 | 29 |
| 7e | 68.1 | 47 |

The melting ranges of the polyformals were 7a: 208°–220° C., 7b: 236°–260° C.; 7c: 250°–270° C.; 7d: 275°–285° C. and 7e: 289°–292° C.

EXAMPLE 8

Preparation of a polyformal with closed terminal groups 227 g (0.5 mole) of tetrabromo-p-xylyleneglycol, 19.5 g (0.65 mole) of paraformaldehyde, 1.3 g of p-toluene-sulfonic acid, 160 g of butanol, 100 ml of o-dichlorobenzene as solvent, and 100 ml of benzene as withdrawing agent for the reaction water were combined in a reaction vessel provided with a condensing system and a water separator, and heated under a slow stream of nitrogen at 95° C. (bath temperature). Over a period of 3½ hours the reaction water was circulated out of the system. A descending condenser system was attached and the bath temperature was raised over a period of 1 hour to 160° C. and maintained at 160° C. for half an hour. The mixture was then heated in 10° C. steps to 210° C. over a period of 1½ hours. After this temperature was reached, 54.7 g (0.1 mole) of pentabromobenzyl-β-hydroxyethylether was added and allowed to react for 1 hour at 220° C. and for 1 hour at 240° C.

After cooling, the polyformal was washed with methanol containing ammonium bicarbonate, and dried at up to a temperature of 150° C.

280.2 g of polyformal of the following structure was obtained, having a melting range of 210°–225° C.:

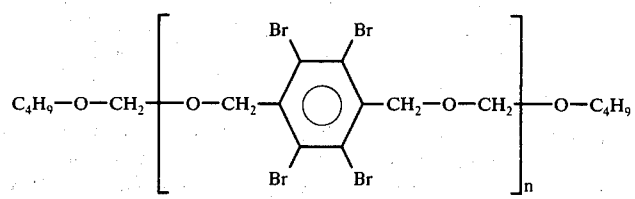

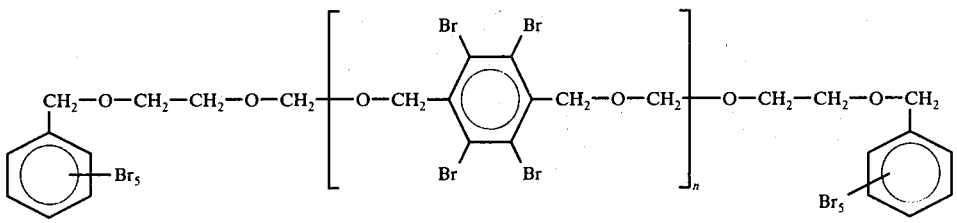

EXAMPLE 9

Preparation of a Polyformal of Formula 2 by the dibutylformal method.

90 g (0.166 mole) of tetrabromo-p-xylylene-bis-(β-hydroxyethylether), 32.9 g (0.205 mole) of dibutylformal and 0.66 g of p-toluenesulfonic acid were dissolved in 150 ml of o-dichlorobenzene and heated under a slow stream of nitrogen at 150° C. (bath temperature) in a reaction vessel equipped with a descending condenser. In steps of 10° C., the temperature was increased such that the butanol which split off in the transacetalization distilled off at a moderate speed. At 200° C. bath temperature the mixture was let stand for one hour and a sample of the solution was taken as Specimen 9a.

The temperature was increased to 220° C. and Specimen 9b was taken after 1 hour.

After 1 hour at 240° C., Specimen 9c was taken and one hour later Specimen 9d was taken at 260° C. and the process was terminated. At the 240° C. bath temperature the solvent had already distilled off and the polyformal was in the form of a melt; Specimens 9a and 9b were precipitated from their solutions by pouring them into methanol (the polyformals precipitating in a plastic state solidified, upon standing in methanol, to solid, granular products).

Polyformals 9a to 9d were dried at room temperature after washing with methanol.

| Polyformal | Melting temperatures and viscosities of the polyformals: | |
|---|---|---|
| | Melting range | M sp/c[1) |
| | 0° C | ml/g |
| 9a | 60–70 | 2.9 |
| 9b | 65–75 | 5.7 |
| 9c | 75–80 | 16.4 |
| 9d | 75–80 | 17.1 |

[1)In o-dichlorobenzene (25° C) c = 0.01 g/ml.

Gel chromatography of polyformal 9c in THF gave a peak at 450 A, which corresponded to a degree of polycondensation n of approximately 30 in structural formula 2. Elemental analysis of polyformal 9c gave 52.9% bromine and 2.3% chlorine, the chlorine content resulting from a slight bromine-chlorine exchange in the preparation of the tetrabromoxylylene dichloride from tetrabromoxylene.

About half of the terminal groups were derived from the butanol and from the diol that was used.

EXAMPLE 10

Preparation of a polyformal of Formula 2

108.4 g (0.2 mole) of tetrabromo-p-xylylene-bis-(β-hydroxyethylether), 6.6 g (0.22 mole) of paraformaldehyde, 1.0 g of p-toluenesulfonic acid, 80 g of butanol, 50 ml of o-dichlorobenzene as solvent and 50 ml of benzene as withdrawing agent for the reaction water were combined in a reaction vessel equipped with a condenser system and a water separator, and heated at 100° C. bath temperature under a slow stream of nitrogen. For 2.5 hours water of reaction was taken out. A descending condenser system was installed and the bath temperature was increased to 150° C. In steps of 10° C. the temperature was raised to 240° C., and all of the substances which are volatile at this bath temperature were distilled out for one hour. After cooling, the polyformal was washed with methanol and dried.

106 g of a polyformal of structure 2 was obtained, with a melting range of 70°–80° C., a halogen content, as determined by elemental analysis, of 52.8% bromine and 2.6% chlorine, and a reduced specific viscosity of 14.6 ml/g. On the basis of gel chromatography in THF (tetrahydrofuran) (peak maximum at 365 A), the polyformal of structural formula 2 contained about 24 basic building blocks.

EXAMPLE 11

By following the procedure of Example 10, but using 0.1 mole of tetrabromo-p-xylylene-bis-(β-hydroxyethylether) and 0.1 mole of tetrabromoxylyleneglycol, a polyformal was obtained having approximately 60% Br and a melting range of 120° to 140° C.

EXAMPLE 12

Preparation of tetrabromo-m-xylylene-bis-(β-hydroxyethylether)

175 g of ethylene glycol was placed in a reaction vessel equipped with a stirrer and a gas introduction tube, 4.4 g (0.11 mole) of a solid sodium hydroxide was added, and was dissolved at room temperature over a period of 5 hours under a slow stream of nitrogen. Then 49.06 g (0.1 mole) of tetrabromo-m-xylylenedichloride was added and the mixture was heated to the reaction temperature of 140° C. Over a period of 1 to 2 hours, the tetrabromoxylylene dichloride passed into solution with reaction. After a total reaction time of 8 hours, the mixture was allowed to cool, while most of the tetrabromo-m-xylylene-bis-(β-hydroxyethylether) crystallized. 200 ml of water was added, with stirring, over a period of 1 hour, and the crystalline reaction product was suction filtered and washed chlorine-free with water. It was dried at room temperature until its weight was constant.

The yield was 49.0 g, corresponding to 90% with respect to the tetrabomo-m-xylylenedichloride.

On the basis of the infrared and NMR spectra, the compound had the following structure:

HO—CH₂—CH₂—O—CH₂ — [benzene ring with Br, Br, Br, Br substituents] — CH₂O—CH₂—CH₂—OH

|  | Found | Calculated |
|---|---|---|
| OH number | 198 | 207 |
| Br | 54.3 | 59.0 |
| Cl* | 3.2 | — |
| Melting Point | 108–114° C | — |

*The chlorine content resulted from a slight bromine-chlorine exchange in the aromatic nucleus in the preparation of the tetrabromo-m-xylylenedichloride from tetrabromo-m-xylene.

EXAMPLE 13

Preparation of a polyformal by the dialkyl formal method in accordance with Formula 1 with the carbon-containing chains in the meta position on the benzene rings.

170 ml of o-dichlorobenzene was placed in a reaction vessel equipped with stirrer and a descending condenser system, and 152.8 g (0.336 mole) of tetrabromo-m-xylyleneglycol, 64.5 g (0.403 mole) of dibutylformal and 0.95 g of p-toluenesulfonic acid (as transacetalization catalyst) were added. The molar ratio of tetrabromoxylyleneglycol to dibutylformal amounted to 1:1.2. The mixture was heated at the reaction temperature under a stream of nitrogen. At a bath temperature of 150°–160° C. the transacetalization commenced, indicated by the production of butanol. The temperature was increased in 10° steps to 240° C. over a period of 2 hours, and was maintained at that level for one hour, while a large part of the o-dichlorobenzene used as solvent was also distilled off, and the reaction product occurred as a finely granular material suspended in the remainder of the o-dichlorobenzene.

The polyformal was washed once with methanol, and then with methanol containing 5% by volume of concentrated ammonia solution (to neutralize the p-toluenesulfonic acid), and dried at up to 170° C.

151 g of a polyformal was obtained having a melting range of 289°–304° C. The yield, with respect to the tetrabromoxylyleneglycol amounted to 96%.

The infrared spectrum of the polyformal showed the following bands (s = strong; m = medium strong; w = weak):

| | | |
|---|---|---|
| 3570 cm⁻¹ | w | ⎫ ν(OH)terminal groups |
| 3450 cm⁻¹ | w | ⎭ |
| 3930 cm⁻¹ | w | ⎫ ν(CH₂) |
| 2880 cm⁻¹ | w | ⎭ |
| 1530 cm⁻¹ | m | ν(C=C)aromatic |
| 1465 cm⁻¹ | m | δ(CH₂) |
| 1350 cm⁻¹ | s | |
| 1220 cm⁻¹ | s | |
| 1155 cm⁻¹ | m | |
| 1100 cm⁻¹ | ⎫ | |
| 1060 cm⁻¹ | ⎬ s | ν(C—O—)acetal |
| 1040 cm⁻¹ | | |
| 1000 cm⁻¹ | ⎭ | |
| 970 cm⁻¹ | m | |
| 935 cm⁻¹ | m | |

The infrared spectrum showed, in addition to the bands of the tetrabromoxylylene radical, a band multiplet in the 1000 – 1110 cm⁻¹ range which is to be associated with the acetal function. A weak OH valence vibration at 3450 cm⁻¹ indicated the presence of OH terminal groups on the end of the chain.

The bromine content was 68.3%.

On the thermal scale (air, heating rate 8° C./min) the polyformal underwent the following weight losses: 1% at 282° C.; 5% at 312° C. and 10% at 321° C.

EXAMPLE 14

Preparation of a polyformal in accordance with the preferred embodiment, but with meta substituents on the nucleus 200 g (0.44 mole) of tetrabromo-m-xylyleneglycol, 17.2 g (0.57 mole) of paraformaldehyde, 1.32 g of p-toluenesulfonic acid, 155 ml of butanol, 111 ml of o-dichlorobenzene as solvent, and 130 ml of benzene as withdrawing agent for the reaction water, were combined in a reaction vessel provided with a condensing system and a water separator. The molar ratio of tetrabromo-m-xylyleneglycol to formaldehyde was 1:1.3.

Under a slow stream of nitrogen, the mixture was heated at 100°–110° C. (bath temperature, and for 3 hours the reaction water formed in accordance with Equation 4 was circulated out of the system. A descending condensing system was installed and the bath temperature was raised to 160° C. over a period of ½ hour. The temperature was then raised in 5° C. steps over a period of 1½ hours to 190° C., and then within 1 hour to 240° C. By the time the 190° C. temperature was reached, the benzene and butanol had been distilled off, and the polyformal began to separate from the solution. To increase the polymerization degree $n$ in structural formula 1, the suspension, which thickened increasingly due to the distillation of most of the o-dichlorobenzene, was held for another 1½ hours at 240°.

After cooling, the granular polyformal was washed and dried as in Example 2. 203 g of a polyformal was obtained which, on the basis of infrared spectroscopy, was in harmony with structural formula 1. The yield was virtually complete, and the melting range was 314°–328° C.

The bromine content was 68.1% according to elemental analysis.

The weight loss upon exposure to heat in an air atmosphere at 200° C. amounted to 2.4% after 24 hours and 5.3% after 72 hours.

EXAMPLE 15

By the procedure of Example 14, but with the use of 13.2 g (0.44 mole) of paraformaldehyde, a polyformal was obtained having a bromine content of 69.2% and a melting range of 292°–312° C., most of whose terminal groups originated from the tetrabromo-m-xylyleneglycol (structural formula 5), according to infrared analysis.

EXAMPLE 16

Preparation of a polyformal having closed terminal groups 227 g (0.5 mole) of tetrabromo-m-xylyleneglycol, 19.5 g (0.65 mole) of paraformaldehyde, 1.3 g of p-toluenesulfonic acid, 160 g of butanol, 100 ml of o-dichlorobenzene as solvent, and 100 ml of benzene as withdrawing agent for the reaction water, were placed in a reaction vessel equipped with a condenser system and a water separator, and heated at 95°–110° C. bath temperature under a slow stream of nitrogen. Over a period of 3 hours the reaction water was circulated out of the system. A descending condenser system was attached and the bath temperature was increased within 1 hour to 160° C., and was raised in 10° steps over a period of 1.5 hours to 200° C. After this temperature was reached, 54.7 g (0.1 mole) of pentabromobenzyl-β-hydroxyethylether was added and the mixture was allowed to react for 1 hour at 200° C. and for 1 hour at 240° C.

After cooling, the polyformal was washed with methanol, and then with methanol containing ammonia, and dried at temperatures up to 170° C. 278 g of a polyformal of the following structure was obtained, having a melting range of 250° to 263° C.

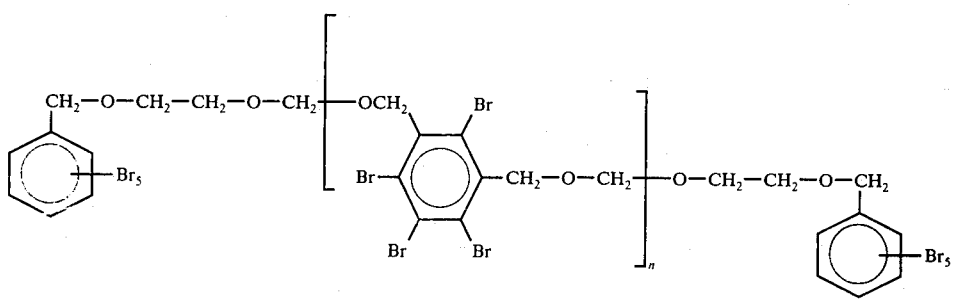

EXAMPLE 17

Preparation of a polyformal of Formula 2

108.4 g (0.2 mole) of tetrabromo-m-xylylene-bis-(β-hydroxyethylether), 6.6 g (0.22 mole) of paraformaldehyde, 1.1 g of p-toluenesulfonic acid, 80 g of butanol, 50 ml of o-dichlorobenzene as solvent, and 50 ml of benzene as withdrawing agent for the reaction water, were combined in a reaction vessel equipped with a condenser system and a water separator, and heated at 100° C. (bath temperature) under a slow stream of nitrogen. For 2.5 h the reaction water was withdrawn. A descending condenser system was installed and the bath temperature was increased to 150° C. The temperature was raised in steps of 10° C. to 240° C., and all of the substances which are volatile at this bath temperature were distilled off at 240° C. for 1 hour. After cooling, the polyformal was washed with methanol and dried.

104.5 g of a polyformal of Structure 2 was obtained, having a melting range of 95°–102° C. (Kofler bench), a halogen content of 53.1% bromine and 1.9% chlorine as determined by elemental analysis, and a reduced specific viscosity (1% solution in o-dichlorobenzene) of 26.6 ml/g.

EXAMPLE 18

By the procedure of Example 17, but with the use of 0.1 mole of tetrabromo-m-xylyleneglycol and 0.1 mole of tetrabromo-m-xylylene-bis-(β-hydroxyethylether), a polyformal was obtained having a melting range (Kofler bench) of 65°–80° C. and a reduced specific viscosity of 16.4 ml/g.

EXAMPLE 19

Use of a partially acetylated tetrabromo-m-xylyleneglycol

In a reaction vessel provided with a condenser and a water separator, 160 g of partially acetylated tetrabromo-m-xylyleneglycol with an acetal group content of 33 mole-%, 13.8 g of paraformaldehyde, 1.04 g of p-toluenesulfonic acid, 160 ml of butanol and 88 ml of o-dichlorobenzene as solvent, plus 100 ml of benzene as withdrawing agent for the water of reaction, were combined and the reaction water from the acetalization was withdrawn over a period of 2½ hours at 100° C. bath temperature under a slow stream of nitrogen. The bath temperature was increased to 125°–130° C. after the installation of a descending condenser, and benzene plus amounts of butyl acetate, which was easily recognized by its odor, passed over together. The temperature was increased over a period of 1 hour to 160° C., and then raised in 5° steps to 190° C. over a period of 1½ hours, and held at that temperature for ¼ hour. After heating at 240° C. to remove most of the o-dichlorobenzene from the reaction vessel, the mixture was let stand at this temperature for 1½ hours.

The polyformal precipitated in granular form was washed with methanol and then washed again with methanol containing ammonium hydroxide, and dried up to 180° C.

141 g of a polyformal of structure Formula 1 was obtained with a melting range of 297°–306° C. At 200° C. in air, the polyformal underwent a weight loss of 1.9% in 7 hours, of 3.1% in 24 hours, and 4.2% in 48 hours.

EXAMPLE 20

Preparation of a mixed polyformal from tetrabromo-m-xylyleneglycol and tetrabromo-p-xylyleneglycol.

By the procedure of Example 3, a mixed polyformal of Structure 2a was obtained, with $p = 0$ and the ratio of k to l equal to 1:1, from 227 g (0.5 mole) of tetrabromo-m-xylyleneglycol, 227 g (0.5 mole) of tetrabromo-p-xylyleneglycol, 33.0 g (1.1 mole) of paraformaldehyde, 2.5 g of p-toluenesulfonic acid as catalyst, 300 ml of butanol, 200 ml of o-dichlorobenzene as solvent and 140 ml of benzene as withdrawing agent for the water of reaction. The yield was 451 g of polyformal with a melting range of 250° to 270° C.

EXAMPLE 21

Mixed formals were obtained in good yield from (a) tetrabromo-m-xylylene-bis-(β-hydroxyethylether) and (b) tetrabromo-p-xylylene-bis-(β-hydroxyethylether) in molar ratios a:b of (I) 30:70 and (II) 60:40, by following the procedure of Example 9 and using these molar ratios.

EXAMPLE 22

Practical application

An oligomeric formal of the formula $$C_4H_9-O-CH_2-\left[ O-CH_2-\underset{\underset{Br}{\underset{|}{\bigcirc}}}{\overset{\overset{Br}{\underset{|}{\phantom{O}}} \overset{Br}{\underset{|}{\phantom{O}}}}{\phantom{\bigcirc}}}-CH_2-O-CH_2 \right]_n -O-CH_2-\underset{\underset{Br}{\underset{|}{\bigcirc}}}{\overset{\overset{Br}{\underset{|}{\phantom{O}}} \overset{Br}{\underset{|}{\phantom{O}}}}{\phantom{\bigcirc}}}-CH_2OH \quad (A)$$

having a melting range of 236°–260° C. and a bromine content of 69%, in the amount of 9% by weight, together with 4% by weight of $Sb_2O_3$, was incorporated by means of a dual screw extruding machine into an amount of polytetramethyleneterephthalate (PTMT $\eta_{red}$ 1.48) sufficient to make the total of 100%. The strands extruded were granulated and injection molded to make specimens of a size of 1.6 × 12.7 × 128 mm for the test UL 94 of Underwriters Laboratories. Exactly the same procedure was followed with a mixture containing, instead of A, the same amount of decabromodiphenyl. Both compositions were rated VO/VO in the UL-94 test, i.e., the best values for self-extinguishing performance. But if a test specimen was heated at 150° C. for 7 days, no change was found in the material of the invention, while a thick, white coating can be wiped from the other, consisting mainly of decabromodiphenyl.

The same results were obtained by repeating Example 1, using a polyethyleneglycol terephthalate as an additional example of a polyester.

In another repetition of Example 1, a high-melting PTMT having a reduced viscosity of about 1.4 was treated for flameproofing with a substance of Formula A having a melting range of about 230°–260° C., with the same result.

EXAMPLE 23

In the procedure described in Example 22, an oligomeric formal of the formula $$\underset{\underset{\underset{CH_2-OH}{|}}{\underset{Br}{\underset{|}{\bigcirc}}}}{\overset{\overset{CH_2-O-CH_2-}{|}}{\overset{Br}{\phantom{\bigcirc}}}} \left[ O-CH_2-\underset{\underset{Br}{\underset{|}{\bigcirc}}}{\overset{\overset{Br}{\phantom{O}} \overset{Br}{\phantom{O}}}{\phantom{\bigcirc}}}-CH_2-O-CH_2 \right]_n -O-CH_2-\underset{\underset{\underset{CH_2-OH}{|}}{\underset{Br}{\underset{|}{\bigcirc}}}}{\overset{\overset{Br}{\phantom{O}}}{\phantom{\bigcirc}}} \quad (B)$$

with a melting range of 250°–270° C. and a bromine content of 69.2% was used, and, for comparison, octabromodiphenyl was used in the same formulation as in Example 1. Test specimens prepared therefrom were rated VO/VO in the UL 94 test. When the test specimens were heated for 7 h in a glass flask under a pressure of 1 Torr at 200° C., the test specimen of the invention remained unaltered, while in the flask containing the control specimen, considerable amounts of white crystals were precipitated on colder parts, these crystals consisting of octabromodiphenyl. The weight loss of the control sample in that case amounted to 2 wt.-%.

The flame testing of the specimens of the invention still produced a VO/VO rating after the heating, while the control specimen rapidly burned up and had to be rated "unacceptable".

EXAMPLE 24

Three mixtures were prepared on the following formulation:
- 57 weight-parts PTMT
- 30 weight-parts glass fibers
- 9 weight-parts flameproofing agent
- 4 weight-parts $Sb_2O_3$ Mixture (a) contains oligomer B as the flameproofing agent, Mixture (b) the common commercial pentabromodiphenyl ether, and Mixture (c) the common commercial tetrabromoxylene.

Each mixture was made into granules using an extruding machine. Only the mixture a) of the invention can be worked in this manner without difficulty; mixtures b) and c) yield vapors severely at the working temperatures. Test specimens were injection-molded from all three granular products.

Results:

UL 94:
 a. and b. VO/VO
 c. "unacceptable", and not subjected to further testing.

Weight loss after 7 days at 150° C.:
 a. 0.2%
 b. 3.6%

EXAMPLE 25

An oligomeric formal of Formula C., with a melting range of 70° to 80° C. was mixed in an amount of 10 wt.-%, together with 5 wt.-% of Sb$_2$O$_3$, with a semi-impact resistant polystyrene, made into granulates on a dual screw extruding machine, and injection molded into test specimens for the UL 94 test. Formula C:

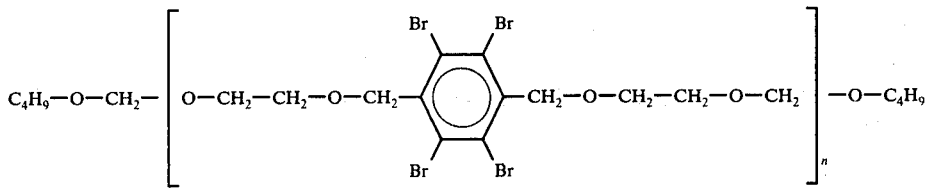

After 14 days of heating at 70° C., no coating was visible on the surface of the specimen. The result of the UL 94 test before and after heating (70° C., 168 h) was VO.

EXAMPLE 26

An oligomeric formal of Formula D, having a melting range of 140°–160° C., with 12 wt.-% and 5 wt.-% Sb$_2$O$_3$, was admixed with an ABS resin on a two-roll mixing mill; the roll skin was then crushed and injection molded to form test specimens. Formula D:

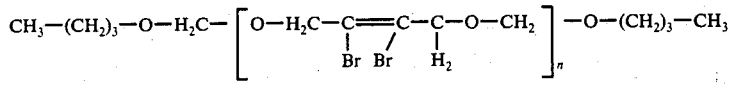

The UL-94 test gave the values VO/VO before and after 14 days of exposure to heat at 70° C.; no chalking was observed on the specimens.

EXAMPLE 27

An oligomeric formal of Formula C with 11 wt.-% and 5 wt-% of Sb$_2$O$_3$ was mixed with polypropylene, the mixture was extruded and granulated, and injection molded to form test specimens. The Ul 94 test rating was VO/VO; no chalking occurred after 14 days of exposure to heat at 70° C.

In the same manner and with similar test results Example 6 was repeated, the polypropylene being replaced by an equal amount of (a) low-pressure polyethylene (d = 0.94) and (b) high-pressure polyethylene (d = 0.92).

EXAMPLE 28

Preparation of polyformal of Formula D

In a reaction vessel equipped with a stirrer and a descending condenser system, 147.6 g (0.6 mole) of dibromobutenediol, 124.8 g (0.78 mole) of dibutylformal, 0.9 g of p-toluenesulfonic acid as catalyst, and 120 ml of o-dichlorobenzene as solvent were mixed together. The molar ratio of the reactants dibromobutenediol:dibutylformal was 1:1.3. The mixture was heated at 156° C. under a slow stream of nitrogen, and the temperature was increased in 10° C. steps such that the butanol formed by transacetalization was distilled off at a moderate rate. When 220° C. was reached, all of the substances that are volatile at this bath temperature were distilled off for one hour. After cooling to room temperature, the solidifying polyformal melt was washed with methanol and dried up to 120° C.

149.7 g of a polyformal of structural formula D was obtained, with a melting range of 140°–160° C. and a bromine content of 61%.

EXAMPLE 29

Polymeric formals of Examples 12 and 17, in amounts of 10 wt.-%, together with 3 wt.-% of Sb$_2$O$_3$, were incorporated into (a) polytetramethyleneterephthalate and (b) polyethylene by means of a dual screw extruding machine.

The flameproofing action in accordance with the LOI and UL94 tests was good, and the weight loss (7 days at 150° C.) was remarkably low.

What is claimed is:

1. In a process for preparing a polymeric formal having 2 to 200 repeating units wherein a dihydric alcohol is contacted with paraformaldehyde in the presence of a solvent and an acid catalyst, the improvement which comprises including in the reaction mixture at least one additional alcohol, or with, instead of paraformaldehyde and additional alcohol, the corresponding dialkyl formal.

2. A process according to claim 1 wherein said additional alcohol is a straight-chained or branched-chained alcohol having 3 to 8 carbon atoms.

3. A process according to claim 2 wherein said alcohol is selected from the group consisting of butanol, i-butanol, tert.-butanol, a pentanol, a hexanol, 2-ethylhexanol, a heptanol, an octanol, benzyl alcohol, cyclohexanol and an ether alcohol.

4. A process according to claim 2 wherein said alcohol is methyl glycol.

5. A process according to claim 2 wherein said solvent is selected from the group consisting of chlorobenzene, dichlorobenzene and trichlorobenzene.

6. A process according to claim 2 wherein said solvent is a chlorinated aromatic hydrocarbon.

7. A process according to claim 2 wherein said solvent is an aprotic solvent.

8. A process according to claim 7 wherein said aprotic solvent is selected from the group consisting of dimethylformamide, dimethylacetamide, dimethylsulfoxide, N-methylpyrrolidone and diphenyl ether.

9. A process according to claim 2 wherein said dihydric alcohol comprises at least one tetrabromoxylylene glycol or tetrabromoxylylene-bis-($\beta$-hydroxyethylether).

10. A process according to claim 9 wherein the mole ratio of dihydric alcohol to paraformaldehyde is in the range of 2:1 to 1:2.

11. A process according to claim 10 wherein the mole ratio of dihydric alcohol to paraformaldehyde is in the range of 1:1 to 1:1.5.

12. A process according to claim 10 wherein the dihydric alcohol is tetrabromo-p-xylyleneglycol.

13. A process according to claim 10 wherein the dihydric alcohol is tetrabromo-m-xylyleneglycol.

14. A process according to claim 10 wherein the dihydric alcohol is tetrabromo-o-xylyleneglycol.

15. A process according to claim 10 wherein the dihydric alcohol is tetrabromo-p-xylylene-bis-(β-hydroxyethylether).

16. A process according to claim 10 wherein the dihydric alcohol is tetrabromo-m-xylylene-bis-(β-hydroxyethylether).

17. A process according to claim 10 wherein the dihydric alcohol is tetrabromo-o-xylylene-bis-(β-hydroxyethylether).

18. A process according to claim 10 wherein said catalyst is selected from the group consisting of $H_2SO_4$, $H_3PO_4$, benzenesulfonic acid, p-toluenesulfonic acid and methanedisulfonic acid.

19. A process according to claim 18 wherein the catalyst is present in the reaction mixture in an amount of between 0.1 and 5 percent by weight.

20. A process according to claim 19 wherein said catalyst is present in the reaction mixture in an amount of between 0.3 and 1.5 percent by weight.

21. A process according to claim 10 wherein the process is conducted at a temperature between 50° and 260° C.

22. A process according to claim 10 wherein the reaction mixture contains at least one additional bromine substituted monoalcohol.

23. A process according to claim 22 wherein the monoalcohol is pentabromobenzyl-β-hydroxyethylether or tris-[bromomethyl]-ethanol.

24. A process according to claim 22 wherein the molar ratio of bromine-substituted monoalcohol to dihydric alcohol is in the range of 1:1–100.

25. A polymer formal of the formula

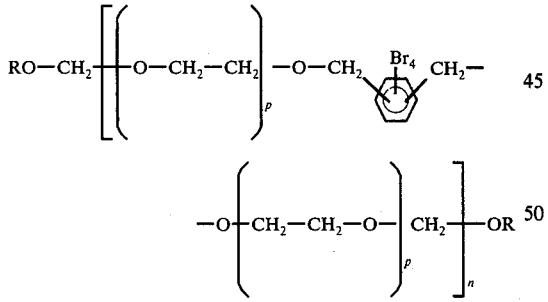

wherein $p$ is 1, $n$ is a positive integer from 2 to 200, R is an optionally halogen substituted straight or branched chain alkyl radical having 3 to 8 carbon atoms, aryl or aralkyl radical which can be substituted on one or both sides by an alkyl or hydroxyalkyl.

26. A polymeric formal having the formula

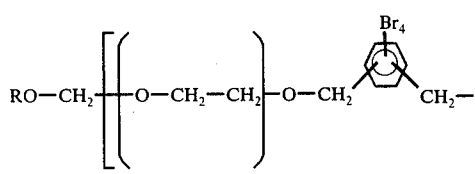

-continued

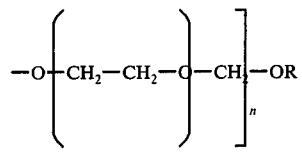

wherein $n$ is a positive integer from 2 to 200, R is an optionally substituted straight or branched chain alkyl radical having 3 to 8 carbon atoms, aryl or aralkyl radicals can be substituted on one or both sides by an alkyl or hydroxyalkyl.

27. A polymer according to claim 26 wherein R is selected from the group consisting of —$(CH_2)_3$—$CH_3$,

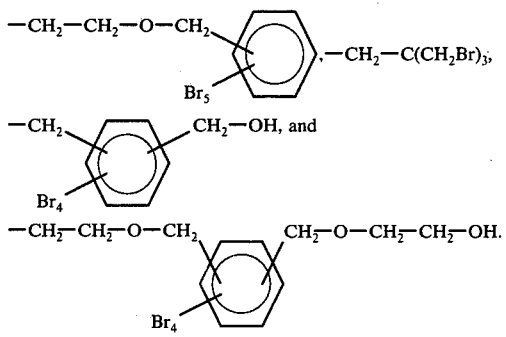

28. A polymeric formal according to claim 26 wherein R is a mononuclear aryl group.

29. A polymeric formal according to claim 26 wherein R is a bromine substituted alkyl group of 3–8 carbon atoms, a bromine substituted mononuclear aryl group or a bromine substituted aralkyl group.

30. A polymeric formal according to claim 26 wherein $n$ is a value from 4 to 25.

31. A polymeric formal according to claim 26 of the formula

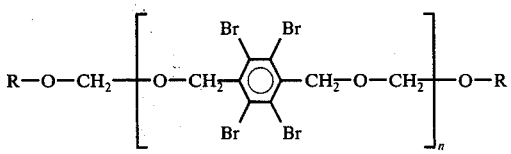

32. A fire-retardant plastic composition comprising a normally flammable plastic and the polymeric formal of claim 26.

33. A fire-retardant plastic composition according to claim 32 wherein said formal is present therein in an amount between 5 and 30 percent by weight.

34. A fire retardant plastic composition according to claim 33 wherein said polymeric formal is present therein in an amount of 5 to 20 weight percent.

35. A fire-retardant plastic composition according to claim 33 wherein said polymeric formal is present therein in an amount of 7 to 12 weight percent.

36. A fire-retardant plastic composition according to claim 33 wherein said plastic is a thermoplastic plastic.

37. A fire-retardant plastic composition according to claim 36 additionally containing 2 to 12 weight percent of antimony or boron compound.

38. A fire-retardant plastic composition according to claim 36 wherein said polymeric formal has a combined bromine and chlorine content of 35 to 85 weight percent.

39. A fire-retardant plastic composition according to claim 36 wherein said polymeric formal has a combined bromine and chlorine content of 56–75 weight percent.

40. A fire-retardant plastic composition according to claim 36 wherein said thermoplastic is a polycondensate.

41. A polymer formal according to claim 26 of the formula

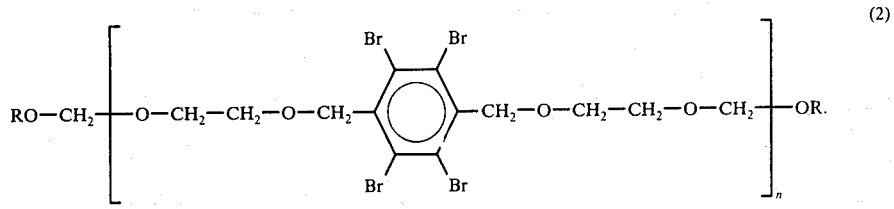

42. A polymeric formal according to claim 26 of the formula

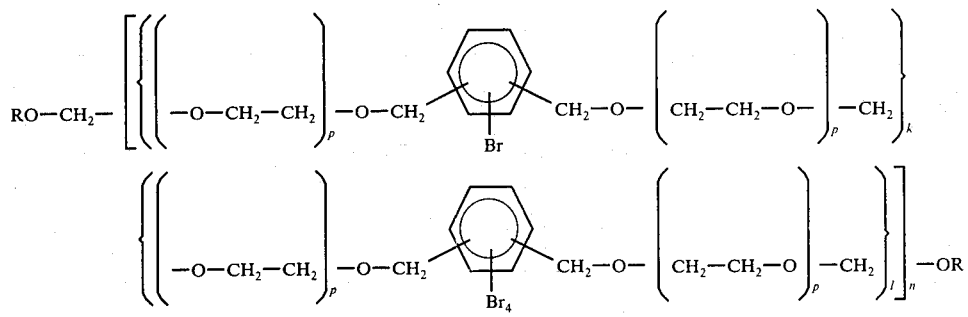

wherein $n$ is $k+1$ and is a positive integer of 2 to 200.

43. A fire retardant plastic composition according to claim 36 wherein said plastic is a polyester.

* * * * *